May 13, 1924.
H. W. SANFORD
GREASE GUN CONNECTION
Filed Sept. 1, 1923
1,494,291
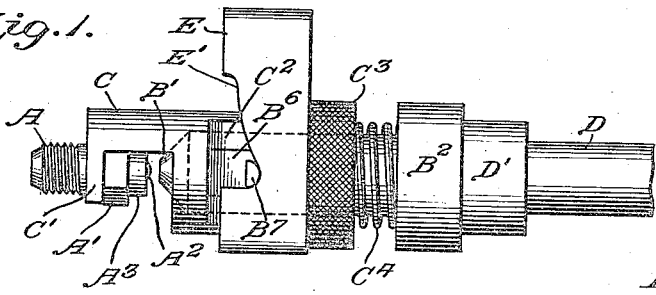
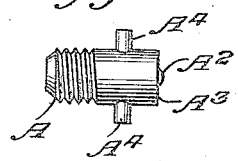
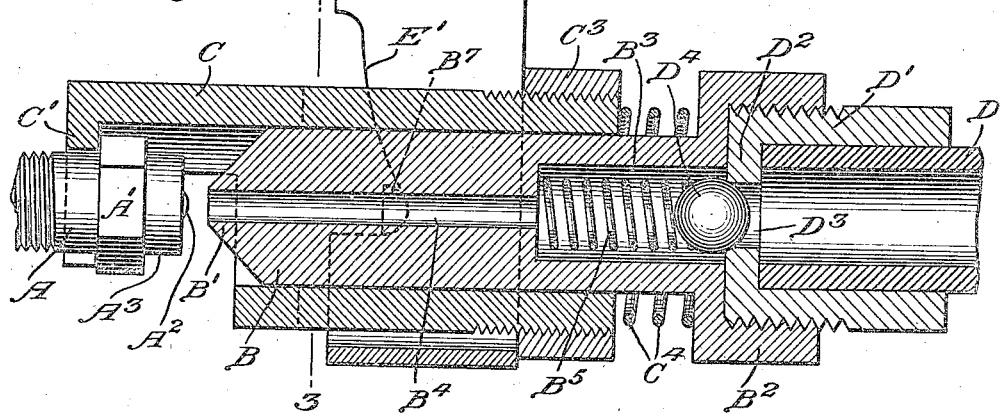
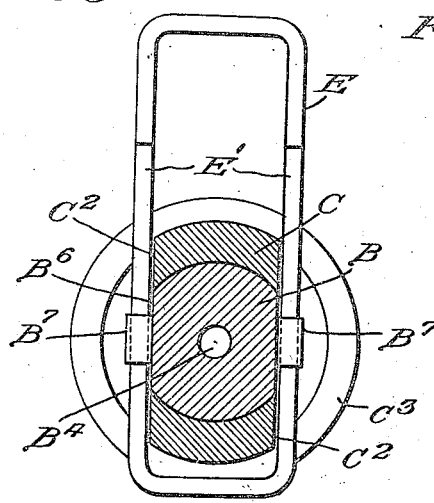
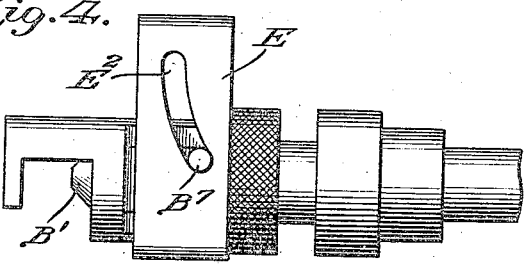
Inventor
Hugh W. Sanford
By Cyrus Kehr
Attorney Patented May 13, 1924.

1,494,291

UNITED STATES PATENT OFFICE.

HUGH W. SANFORD, OF KNOXVILLE, TENNESSEE.

GREASE-GUN CONNECTION.

Application filed September 1, 1923. Serial No. 660,840.

*To all whom it may concern:*

Be it known that I, HUGH W. SANFORD, a citizen of the United States, residing at Knoxville, in the county of Knox and State of Tennessee, have invented a new and useful Improvement in Grease-Gun Connections, of which the following is a specification, reference being had to the accompanying drawing.

This invention relates particularly to means for connecting a grease gun with a transmission member which is in operative relation with a bearing or other structure to receive and transmit grease into said bearing or structure. Usually said transmission member is a nipple or tubular screw plug having a ball valve which is unseated by the application of pressure thereto through the grease gun connection. And usually the transmission member has a head or lugs to be engaged by the connection. In the present invention, the connection includes a hook-form member adapted to engage the head or lugs on the transmission member. The object of this invention is to provide convenient and efficient means for moving the connection nozzle to its seat on the transmission member after the connection has been placed into position.

In the accompanying drawings,

Fig. 1 is a side elevation of a mechanism embodying my improvement;

Fig. 2 is a longitudinal, upright section of the mechanism shown by Fig. 1;

Fig. 3 is an upright section on the line, 3—3, of Fig. 2, looking toward the right;

Fig. 4 is an elevation, similar to Fig. 1, of another form of the mechanism;

Fig. 5 is a detail view of a transmission member in another form.

Referring first to Figs. 1, 2 and 3 of said drawings, A, is a transmission member which is in the form of a tubular screw plug threaded externally and having a head, $A^1$, and a valve ball, $A^2$, which is surrounded by a face, $A^3$, against which the nozzle of the connection is to bear.

The forward or discharge end, $B^1$, of the nozzle, B, is to be pressed against the face, $A^3$, around the valve ball, $A^2$, and then grease is to be forced through the tube, D, and the nozzle, B, into and through the transmission member, A.

The body of the nozzle, B, is cylindrical, and on its right or rear end it has an interiorly screw threaded sleeve or socket, $B^2$, which receives the correspondingly exteriorly screw threaded tube coupling member, $D^1$, into which is fitted the tube, D. The coupling member, $D^1$, has a transverse end wall, $D^2$, between the adjacent end of the tube, D, and the nozzle body, B. In said wall is an aperture, $D^3$, over which is seated a valve ball, $D^4$, which extends into the chamber, $B^5$, of the nozzle, said chamber being cylindrical and on the axial line of the nozzle and communicating with the bore, $B^4$, of the nozzle. An expanding coiled spring, $D^5$, placed in the chamber, $B^5$, tends to press the ball, $D^4$, to its seat around the aperture, $D^3$. When grease is pressed through the tube, D, into the nozzle, said ball is pressed from its seat toward the forward discharge end of the nozzle.

The body, B, of the nozzle is slidable endwise in the tubular barrel or holder, C, which has on its outer or left hand end the transverse divided hook, $C^1$, which is adapted to be placed astride the body of the transmission member, A, forward of the head, $A^1$, of said member, the opening in the hook being smaller than the head, $A^1$, in order that said head may resist movement of the barrel, C, parallel to the nozzle axis and away from the transmission member.

When the barrel, C, has been thus applied to the transmission member, the nozzle, B, and the parts carried thereby are to be moved forward or toward the transmission member until the discharge end, $B^1$, of the nozzle bears so firmly against the face, $A^3$, of the transmission member as to prevent leakage of grease between said nozzle and said face when pressure is applied through the tube, D, for driving grease through the nozzle and the transmission member.

The parts are to be so proportioned as to leave between the hook, $C^1$, and the end, $B^1$, of the nozzle only as much space as is needed for conveniently applying the hook to the transmission member. When the barrel and the hook have been applied to the transmission member, the nozzle is to be given its forward movement into working position by operator-controlled means as will now be described.

A link-form wedge member, E, surrounds the barrel, C, and the nozzle, the barrel being cut away at opposite sides at $C^2$, and the body of the nozzle being cut away at $B^6$, in the same plane, to receive the sides of the link-form wedge member, E. This cutting forms a channel at each side of the barrel and nozzle in which the member, E, may slide transversely to the axis of the nozzle.

An adjusting ring, C³, is threaded around the rear or right hand end of the barrel, C, in position to bear against the member, E. By turning said ring, its position on the holder will be shifted, and by that means the distance through which the member, E, may move away from the hook, C¹, of the barrel is varied. Thus this ring forms an adjustable abutment for the cam member. On each face, B⁶, of the nozzle (which faces are exposed by cutting away the wall of the holder, C, as shown in Figs. 1 and 3) is a fixed stud, B⁷. At each side of the member, E, the forward edge is so cut as to form an inclined edge or face, E¹, adapted to engage the adjacent stud, B⁷. Said faces, E¹, constitute cam or wedge faces. Between the ring, C³, and the socket member, B², an expanding coiled spring, C⁴, surrounds the body of the nozzle and tends to relatively push or press the barrel, C, away from the socket member, B², whereby the maximum distance between the hook, C¹, and the forward end of the nozzle is attained. But such movement is limited by engagement between the studs, B⁷, and the cam faces, E¹. The maximum of that movement is reached when the link member, E, has been shifted transversely to bring the rearmost part of the cam faces, E¹, into position to engage the lugs, B⁷, as is shown in Fig. 1. If now the cam member, E, is pressed transversely in the proper direction, said member will force the studs, B⁷, and the nozzle forward toward the transmission member A. The member, E, is so placed and so proportioned as to adapt it to be engaged at its outer end by the thumb of the operator's hand which holds the connection. That hand may grasp the connection and move it to apply the hook, C¹, to the transmission member and then, by the thumb, press the member, E, transversely until such movement is arrested by contact of the nozzle end, B¹, with the face, A³, of the transmission member. If, after this movement has proceeded as far as is possible with the pressure of the thumb, the operator desires to make the engagement between the nozzle and the transmission member with still greater force, he can now release the hand from the connection (the connection now being held on the transmission member by the hook and nozzle) and merely engage the ring or sleeve, C³, and turn it for movement toward the transmission member, whereby the link member, E, is forced toward the transmission member. The pitch of the threads on the ring, C³, and the barrel may be much lower than the pitch of the cam faces, E¹, whereby relatively small power applied to said ring will cause large pressure by the ring against the link member, E. When the link member is moved in the reverse direction, the spring, C⁴, will cause the rearward movement or retreat of the nozzle and hold the nozzle in its rear position.

In the form shown by Fig. 4, the spring, C⁴, is omitted and the link member, E, is provided with a diagonal slot into which extend the lugs, B⁷. This slot presents two opposing cam faces, E¹ and E². Pressing the member, E, down, as shown in Fig. 4 will cause the cam face, E¹, to force the forward movement of the nozzle. Thereafter a reverse movement will cause the cam faces, E², to force the nozzle to retreat toward the right and remain in such position.

In Fig. 5, the transmission member has lugs, A⁴, in lieu of the head, A¹, to be engaged by the barrel.

In either form of the connection, its operation is under control of one hand of the operator. On automobiles and other structures, often the space through which the transmission member is to be reached is so limited as to barely admit the connection and one hand and often there is not enough room to rotate the barrel and the hand for engaging the barrel or moving the nozzle forward. As is apparent from the foregoing description, my improved barrel and the nozzle may be put into engagement with the transmission member with the action of the one hand of the operator and without rotating the barrel or the actuating means supported by the barrel.

I claim as my invention,

1. In a grease gun connection, the combination of a barrel formed for engagement with a transmission member, a nozzle in the barrel, a cam member held for transverse movement on the barrel and in operative relation with the nozzle to move the nozzle forward, substantially as described.

2. In a grease gun connection, the combination of a barrel having a divided hook adapted to engage a transmission member, a nozzle in the barrel, a cam member held for transverse movement on the barrel and in operative relation with the nozzle to move the nozzle forward, substantially as described.

3. In a grease gun connection, the combination of a barrel formed for engagement with a transmission member, a nozzle in the barrel and having lugs extending outward through the barrel, a cam member held for transverse movement on the barrel and in engagement with said lugs, substantially as described.

4. In a grease gun connection, the combination of a barrel formed for engagement with a transmission member, a nozzle in the barrel, a cam member held for transverse movement on the barrel and in operative relation with the nozzle to move the nozzle forward, and a ring screw threaded on the barrel and forming an adjustable abutment for said cam member, substantially as described.

5. In a grease gun connection, the combination of a barrel formed for engagement with a transmission member, a nozzle in the barrel, a cam member held for transverse movement on the barrel and in operative relation with the nozzle to move the nozzle forward, and a spring in operative relation with the barrel and the nozzle to tend to retreat the nozzle, substantially as described.

6. In a grease gun connection, the combination of a barrel formed for engagement with a transmission member, a nozzle in the barrel, a link-form cam member surrounding the barrel and held for transverse movement on the barrel and in operative relation with the nozzle to move the nozzle forward, substantially as described.

7. In a grease gun connection, the combination of a barrel formed for engagement with a transmission member, a nozzle in the barrel, a link-form cam member surrounding the barrel and held for transverse movement on the barrel and in operative relation with the nozzle to move the nozzle forward, and a ring screw threaded on the barrel and forming an adjustable abutment for said cam member, substantially as described.

8. In a grease gun connection, the combination of a barrel formed for engagement with a transmission member, a nozzle movable endwise in the barrel, operator-controlled means in operative relation with the barrel and the nozzle for moving the nozzle forward while the barrel is in engagement with the transmission member and at rest, substantially as described.

In testimony whereof I have signed my name, this 30th day of August, in the year one thousand nine hundred and twenty-three.

HUGH W. SANFORD.